No. 695,387. Patented Mar. 11, 1902.
H. P. GROSS, Jr.
FASTENING FOR WASHSTANDS.
(Application filed Nov. 4, 1901.)
(No Model.)

Witnesses:
Charles L. Durbrow
George H. Read

Inventor:
Harry P. Gross Jr.
By Chapin & Ferguson,
Attorney.

UNITED STATES PATENT OFFICE.

HARRY P. GROSS, JR., OF BALTIMORE, MARYLAND.

FASTENING FOR WASHSTANDS.

SPECIFICATION forming part of Letters Patent No. 695,387, dated March 11, 1902.

Application filed November 4, 1901. Serial No. 81,033. (No model.)

*To all whom it may concern:*

Be it known that I, HARRY P. GROSS, Jr., a citizen of the United States, residing at Baltimore, in the State of Maryland, have invented certain new and useful Improvements in Fastenings for Washstands, of which the following is a specification.

This invention relates to improvements in fastenings for washstands.

The object of the invention is to provide a simple, cheap, and efficient device for holding washbasins to washstands without the use of solder or cement and which may be readily secured in position and removed therefrom when desired.

The invention consists of the new and novel parts and combination of parts hereinafter more fully set forth and described in the specification and pointed out in the claims.

Figure 1:
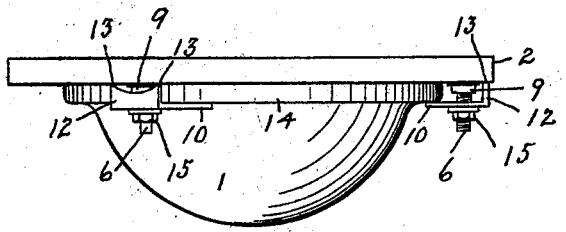
Figure 2:
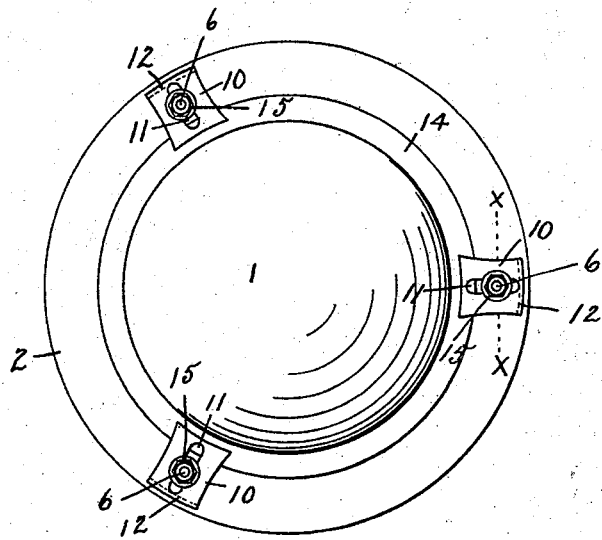
Figure 3:
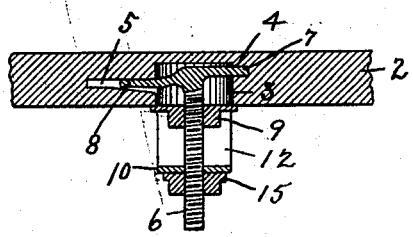
Figure 5:
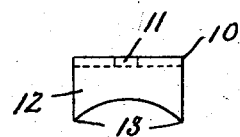
Figure 4:

In the accompanying drawings, Figure 1 is a side elevation of a washbowl secured to the stand by my improved fastening. Fig. 2 is an inverted plan view of same. Fig. 3 is a vertical cross-section on the line $x\ x$ of Fig. 2. Fig. 4 is a detailed plan view of the clamp forming part of my improved fastening, and Fig. 5 is an end view of same.

Similar numerals designate like parts in the several views.

In the accompanying drawings, forming part of this specification, 1 designates a washbasin or bowl, and 2 the stand to which the bowl is secured. The stand 2 is provided with an aperture 3 and two radial apertures 4 and 5, the latter tapering from the aperture 3 inwardly. The bolt 6 has a cross-head formed at its upper end. The end 7 of the cross-head is shorter than and out of line with the end 8 of the said cross-head. The bolt 6 is first secured to the stand 2 by placing the long end 8 of the cross-head into the aperture 5 and pushing the said end far enough into the said aperture to allow the short end 7 of the cross-head to pass down into the aperture 3 until it comes opposite the aperture 4. It is then forced in to the limit of the said aperture 4, which will bring the bolt 6 in the center of the aperture 3, where it is held by the nut 9. The clamp 10 is provided with an elongated slot 11 and has one end 12 bent upwardly at right angles to said clamp. This upwardly-bent end 12 is concaved to form the points 13. The clamp 10 is placed in position with one end impinging against the flange 14 of the washbowl 1 and the upwardly-bent end impinging against the stand 2. The bolt 6 projects through the elongated slot 11 and is provided with a nut 15 to draw the said clamp up tightly against the stand and bowl. When the parts are drawn tightly together, the points 13 of the clamp being sharp take into the stand 2 slightly and prevent the clamp from slipping.

It will be seen that by providing the clamp 10 with the elongated slot 11 the said clamp may be adjusted to any position on the bolt 6.

Having thus described my invention, what I claim as new, and desire to secure by Letters Patent of the United States, is—

1. As an article of manufacture, a fastener designed for attaching washbowls to washstands, comprising a bolt having a cross-head adapted to be secured in the washstand, a nut for securing the bolt to the stand, a clamp fitted over the bolt to clamp the washbowl, said clamp having one end bent at right angles thereto and terminating in sharp points, and a nut to secure the said clamp in position on the bolt, substantially as described.

2. As an article of manufacture, a fastener designed for attaching washbowls to washstands, comprising a bolt having a cross-head, one end of which is shorter than and out of line with the other, a nut to secure the bolt to the stand, a clamp fitted over the bolt to clamp the washbowl, and a nut to secure the said clamp in position on the bolt, substantially as described.

3. The combination with the washstand and bowl, of a bolt having a cross-head adapted to be fitted within the washstand, one end of said cross-head being out of line with the other end; a nut to secure the said bolt to the stand; a clamp fitted over the bolt and impinging against the bowl and stand; and a nut to hold the said clamp to the bolt, substantially as described.

4. The combination with the bowl, 1, and stand, 2, of a bolt, 6, having a cross-head formed of a short end, 7, and a long end 8, 100 the end 7 being out of line with the end 8; a nut, 9, to hold the bolt, 6, in position; a clamp, 10, fitted over the bolt, 6, and having one end impinging against the washbowl and the other end bent at right angles and terminating in sharp points and impinging against the stand; and a nut, 15, to hold the clamp in position, substantially as described.

5. The combination of the washbowl; the washstand having apertures 3, 4, and 5; a bolt 6, having a cross-head formed of the short end 7 and a long end 8 and adapted to be fitted in the said apertures, the said end 7 being out of line with the end 8; a nut 9 to secure the said bolt in position; a clamp 10 fitted over the said bolt and having one end impinging against the bowl and the other end bent at right angles and terminating in sharp points and impinging against the stand; and a nut, 15, to secure the clamp 10 in position on the bolt 6 and cause the said points to take into the stand, substantially as described.

In testimony whereof I affix my signature in the presence of two witnesses.

HARRY P. GROSS, JR.

Witnesses:
CHAPIN A. FERGUSON,
THOS. C. BAILEY.